April 4, 1939. M. M. BORDEN 2,153,450
SINGLE HEAD METER
Filed May 16, 1938

Inventor:—
Moro M. Borden
by his Attorneys
Howson & Howson

Patented Apr. 4, 1939

2,153,450

UNITED STATES PATENT OFFICE 2,153,450

SINGLE HEAD METER

Moro M. Borden, Philadelphia, Pa., assignor to Simplex Valve and Meter Company, Philadelphia, Pa., a corporation of Delaware Application May 16, 1938, Serial No. 208,305

10 Claims. (Cl. 73—215)

This invention relates to single-head meters, and more particularly to a device for measuring the head or flow over a weir.

An important object of the invention is the use in a device of this character of a submerged air tip for controlling the operation of the meter, in which the arrangement of the tip is made such that it is possible to measure zero flow over the weir and at the same time to counterbalance the weight of the meter-operating parts through the degree of submergence of the tip.

A further object of the invention is to provide a construction in which the change in head is readily converted to terms of flow over the weir.

Figure 1:
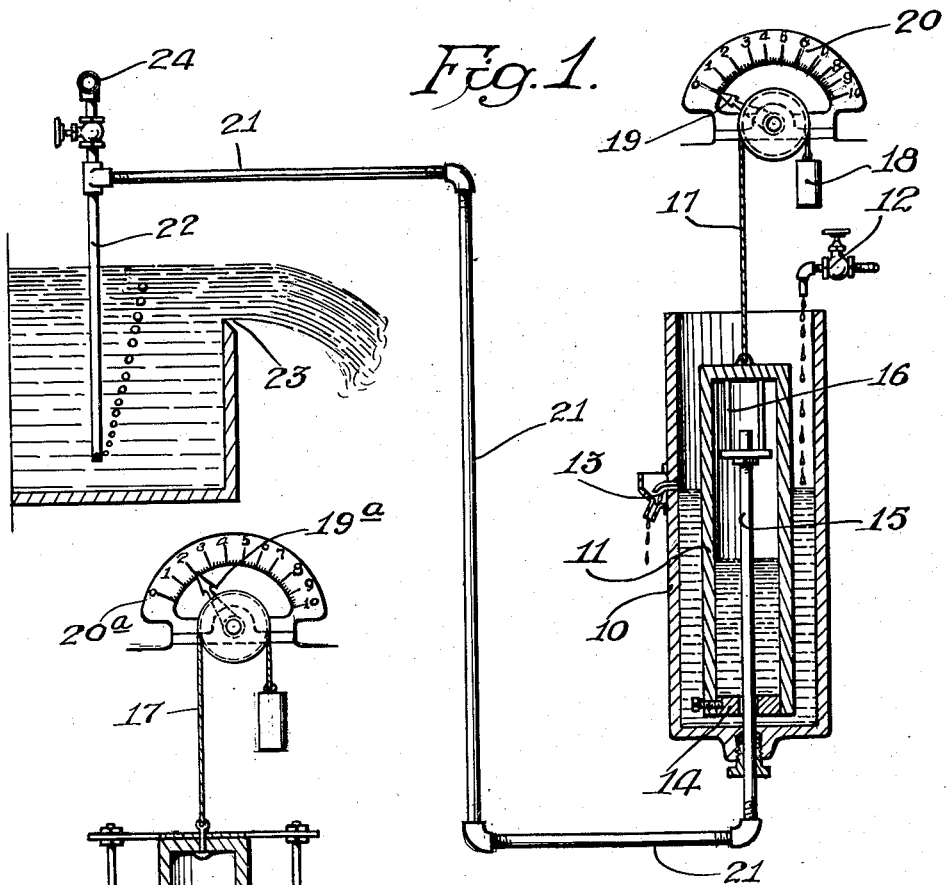
Figure 2:
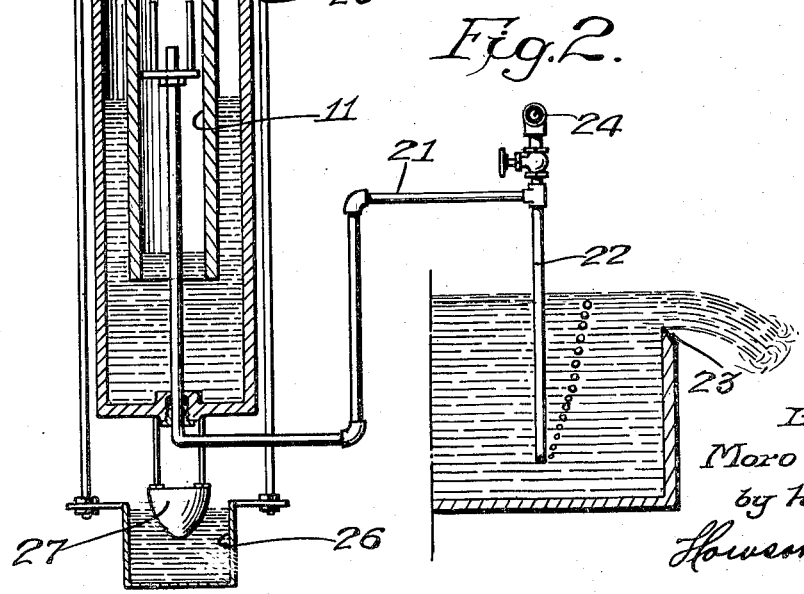

These and other objects I attain by the construction shown in the accompanying drawing, wherein, for the purpose of illustration, I have shown a preferred embodiment of my invention and wherein:

Fig. 1 is a semi-diagrammatic view showing a form of my invention suitable for use in measuring the head at the weir; and Fig. 2 is a view similar to that of Figure 1 but illustrating a construction suitable for measuring the rate of flow over the weir.

Referring now to the drawing, and more particularly to Figure 1 thereof, the numeral 10 generally designates a fluid-containing chamber. In the construction of Fig. 1, a constant drip device 12 feeds liquid to the chamber from which it escapes through an overflow 13, thus maintaining the constant level. The float 11 is open-bottomed, and may be varied as to weight either by variations in the thickness of the walls thereof or by variations in the weight of an applied counterweight 14. Extending upwardly through the bottom of the container is a pipe 15, the upper end of which is preferably provided with a bracket 16 adapted to engage the upper end wall of the float when in lowermost position and hold the same in spaced relation to the mouth of the pipe. Float 11 may be utilized in operating any suitable indicator or meter. It is at present illustrated as having connected thereto a flexible element 17 which is counterweighted at 18 and operates a pointer 19 coacting with the dial 20. Pipe 15 is connected through a conduit 21 with a bubble pipe 22, the tip of which is submerged below the throat 23 of an associated weir a distance such that the effective weight of the float 11 is counterbalanced by the pressure generated through the head between the tip and throat when fluid pressure is admitted to conduit 21 from a source of pressure 24.

By careful installation of the bubble pipe 22, a generated pressure in conduit 21 and pipe 15 may be made just sufficient to support the float with the upper end thereof very slightly spaced from the upper end of the bracket 16 so that zero flow may be delicately indicated by the pointer 19 or a corresponding structure. Obviously, any head above the throat of the weir will result in an increase in pressure at the interior of the float causing the same to elevate and vary the indication by pointer 19 accordingly.

In Fig. 2 I have illustrated a variation of this structure which will enable registration of the rate of flow over the weir by a scale 20a uniformly graduated in terms of flow coacting with the pointer 19a. In this form, the float 11 has secured thereto through a suitable connecting framework 25 a liquid-containing chamber 26 which moves in accordance with movements of the float. The chamber 10 has secured thereto a shaped element 27 which, through movements of the float, is submerged to a greater or less extent in the liquid of chamber 26 which is preferably mercury. Obviously, varying degrees of submergence will alter the buoyancy of the float 11, and by properly shaping the member 27 this variation and buoyancy may be made to correspond to variation in flow over the throat 23 of the weir. It will also be obvious that the illustrated arrangement of the shaped member and the fluid in which it is variably submergible is but one means to obtaining the end, and that any means for variably engaging the shaped member in the liquid may be substituted for that shown.

While I have above referred to means for maintaining a constant level in the chambers, it will be obvious that any means such as that illustrated is necessary only when the liquid employed is a volatile one.

Since the constructions given are purely illustrative, I do not wish to be understood as limiting myself thereto except as hereinafter claimed.

I claim:

1. In a weir meter or the like, a weir, a liquid-containing chamber, an open-bottomed float in the chamber, an indicator operated by the float, a bubble pipe having its mouth submerged in the liquid upstream of the weir, a conduit connecting said bubble pipe and the interior of said float and a source of gaseous pressure communicating with said conduit, the mouth of said bubble pipe being submerged in the liquid to an extent such that the effective pressure in the float counterbalances the effective weight of the float when flow over the weir is zero.

2. In a weir meter or the like, a weir, a liquid-containing chamber, an open-bottomed float in the chamber, an indicator operated by the float, a bubble pipe having its mouth submerged in the liquid upstream of the weir, a conduit connecting said bubble pipe and the interior of said float, a source of gaseous pressure communicating with said conduit, the mouth of said bubble pipe being submerged in the liquid to an extent such that the effective pressure in the float counterbalances the effective weight of the float when flow over the weir is zero, and means for maintaining a constant liquid level in the chamber.

3. In a weir meter or the like, a weir, a liquid-containing chamber, an open-bottomed float in the chamber, an indicator operated by the float, a bubble pipe having its mouth submerged in the liquid upstream of the weir, a conduit connecting said bubble pipe and the interior of said float, a source of gaseous pressure communicating with said conduit, the mouth of said bubble pipe being submerged in the liquid to an extent such that the effective pressure in the float counterbalances the effective weight of the float when flow over the weir is zero, and means whereby the float movement in response to pressure variations in said conduit is varied in accordance with the rate of flow over the weir.

4. In a weir meter or the like, a weir, a liquid-containing chamber, an open-bottomed float in the chamber, an indicator operated by the float, a bubble pipe having its mouth submerged in the liquid upstream of the weir, a conduit connecting said bubble pipe and the interior of said float, a source of gaseous pressure communicating with said conduit, the mouth of said bubble pipe being submerged in the liquid to an extent such that the effective pressure in the float counterbalances the effective weight of the float when flow over the weir is zero, means for maintaining a constant liquid level in the chamber, and means whereby the float movement in response to pressure variations in said conduit is varied in accordance with the rate of flow over the weir.

5. In a weir meter or the like, a weir, a liquid-containing chamber, an open-bottomed float in the chamber, an indicator operated by the float, a bubble pipe having its mouth submerged in the liquid upstream of the weir, a conduit connecting said bubble pipe and the interior of said float, a source of gaseous pressure communicating with said conduit, the mouth of said bubble pipe being submerged in the liquid to an extent such that the effective pressure in the float counterbalances the effective weight of the float when flow over the weir is zero, a second liquid-containing chamber, a shaped member fixed with relation to the first named chamber and engaging in the fluid in the second chamber, and means whereby movements of said float are imparted to said second chamber.

6. In a weir meter or the like, a weir, a liquid-containing chamber, an open-bottomed float in the chamber, an indicator operated by the float, a bubble pipe having its mouth submerged in the liquid upstream of the weir, a conduit connecting said bubble pipe and the interior of said float, a source of gaseous pressure communicating with said conduit, the mouth of said bubble pipe being submerged in the liquid to an extent such that the effective pressure in the float counterbalances the effective weight of the float when flow over the weir is zero, means for maintaining a constant liquid level in the chamber, a second liquid-containing chamber, a shaped member fixed with relation to the first chamber and engaging in the fluid of the second chamber, and means whereby movements of said float are imparted to said second chamber.

7. In a weir meter or the like, a weir, a liquid-containing chamber, an open-bottomed float in the chamber, an indicator operated by the float, a bubble pipe having its mouth submerged in the liquid upstream of the weir, a conduit connecting said bubble pipe and the interior of said float, a source of gaseous pressure communicating with said conduit, the mouth of said bubble pipe being submerged in the liquid to an extent such that the effective pressure in the float counterbalances the effective weight of the float when flow over the weir is zero, means for maintaining a constant liquid level in the chamber, a second liquid-containing chamber, a shaped member engaging in the fluid of said second liquid-containing chamber, and means whereby movements of said float are imparted to one of said second chamber and shaped member, the other of said second chamber and shaped member being fixed with relation to the first chamber.

8. In a weir meter or the like, a weir, a liquid-containing chamber, an open-bottomed float in the chamber, an indicator operated by the float, a bubble pipe having its mouth submerged in the liquid upstream of the weir, a conduit connecting said bubble pipe and the interior of said float, a source of gaseous pressure communicating with said conduit, the mouth of said bubble pipe being submerged in the liquid to an extent such that the effective pressure in the float counterbalances the effective weight of the float when flow over the weir is zero, a second liquid-containing chamber, a shaped member engaging in the fluid of said second liquid-containing chamber, and means whereby movements of said float are imparted to one of said second chamber and shaped member, the other of said second chamber and shaped member being fixed with relation to the first chamber.

9. In a weir meter or the like, a weir, a liquid-containing chamber, an open-bottomed float in the chamber, an indicator operated by the float, a bubble pipe having its mouth submerged in the liquid upstream of the weir, a conduit connecting said bubble pipe and the interior of said float, a source of gaseous pressure communicating with said conduit, the mouth of said bubble pipe being submerged in the liquid to an extent such that the effective pressure in the float counterbalances the effective weight of the float when flow over the weir is zero, a shaped member, a fluid in which the shaped member is variably submergible, and means to vary the submergence of the shaped member in said fluid in accordance with movements of the float thereby modifying the action of the float in accordance with a function of the flow over the weir.

10. In a weir meter or the like, a weir, a liquid-containing chamber, an open-bottomed float in the chamber, an indicator operated by the float, a bubble pipe having its mouth submerged in the liquid upstream of the weir, a conduit connecting said bubble pipe and the interior of said float, a source of gaseous pressure communicating with said conduit, the mouth of said bubble pipe being submerged in the liquid to an extent such that the effective pressure in the float counterbalances the effective weight of the float when flow over the weir is zero, means for maintaining a constant liquid level in the container, a shaped member, a fluid in which the shaped member is variably submergible, and means to vary the submergence of the shaped member in said fluid in accordance with movements of the float thereby modifying the action of the float in accordance with a function of the flow over the weir.

MORO M. BORDEN.